United States Patent [19]
Cathenaut

[11] Patent Number: 6,006,535
[45] Date of Patent: Dec. 28, 1999

[54] APPARATUS INTEGRATED FOR METERING PRODUCTS TO AND SUCTIONING PRODUCTS FROM MOLDS

[75] Inventor: Philip Igor Cathenaut, Beauvais, France

[73] Assignee: Nestec S.A., Vevey, Switzerland

[21] Appl. No.: 08/967,570

[22] Filed: Nov. 10, 1997

[30] Foreign Application Priority Data

Nov. 12, 1996 [EP] European Pat. Off. .............. 96203154

[51] Int. Cl.⁶ .................................................. A23G 9/10
[52] U.S. Cl. ............................ 62/345; 425/134; 425/217
[58] Field of Search .............................. 62/345; 425/130, 425/134, 217, 449

[56] References Cited

U.S. PATENT DOCUMENTS

| | | | |
|---|---|---|---|
| 2,212,863 | 8/1940 | Hughes | 107/8 |
| 3,412,431 | 11/1968 | Lemelson | 425/217 |
| 3,529,553 | 9/1970 | Rutter | 107/4 |
| 5,374,436 | 12/1994 | White et al. | 62/345 |
| 5,516,540 | 5/1996 | Cathenaut | 62/345 |
| 5,554,325 | 9/1996 | Kotte et al. | 425/217 |
| 5,582,856 | 12/1996 | White et al. | 62/345 |
| 5,720,175 | 2/1998 | White et al. | 62/345 |

FOREIGN PATENT DOCUMENTS

| | | | |
|---|---|---|---|
| 0322469 | 7/1989 | European Pat. Off. | A23G 9/02 |
| 0733308 | 9/1996 | European Pat. Off. | A23G 9/02 |

*Primary Examiner*—William E. Tapolcai
*Attorney, Agent, or Firm*—Vogt & O'Donnell, LLP

[57] ABSTRACT

Apparatus integrated for metering liquid products, particularly viscous products, into molds to prepare molded article products and for suctioning liquid product from the molds to remove liquid from the molded article products and to recycle suctioned liquid product includes a hopper for containing liquid product for supply to a liquid product metering component which meters the liquid product into molds, and the apparatus further includes components including a pipette device for suctioning liquid product from molds and recycling suctioned liquid product to the hopper. Further components of the apparatus are provided so that a headspace is maintained in the hopper, and components including a vacuum pump are connected to the hopper at positions for providing a vacuum pressure in the headspace and for suctioning liquid product via the pipette device from molds.

14 Claims, 2 Drawing Sheets

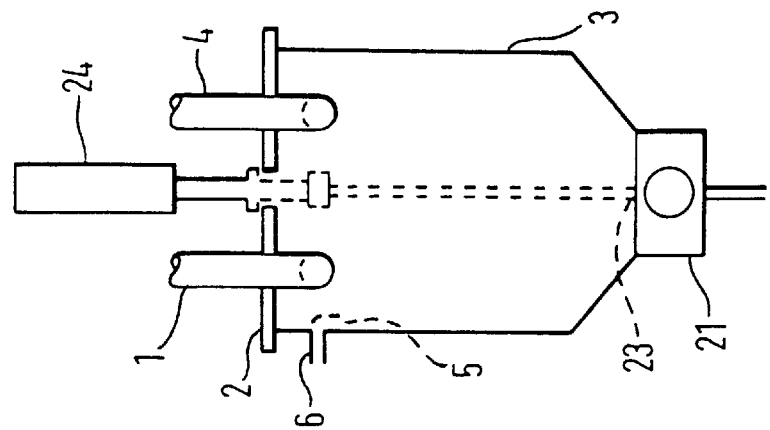
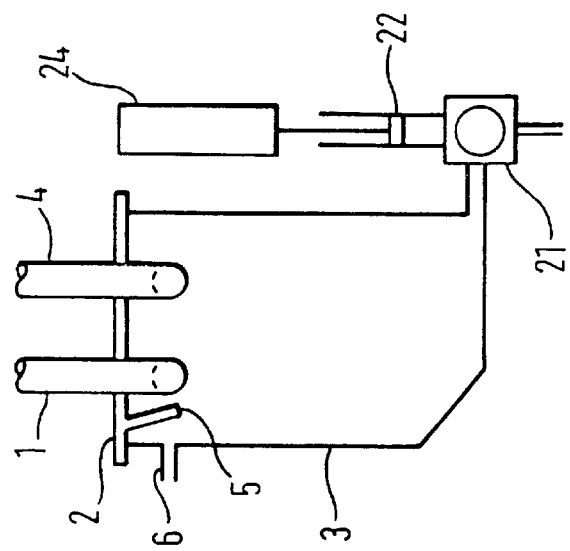
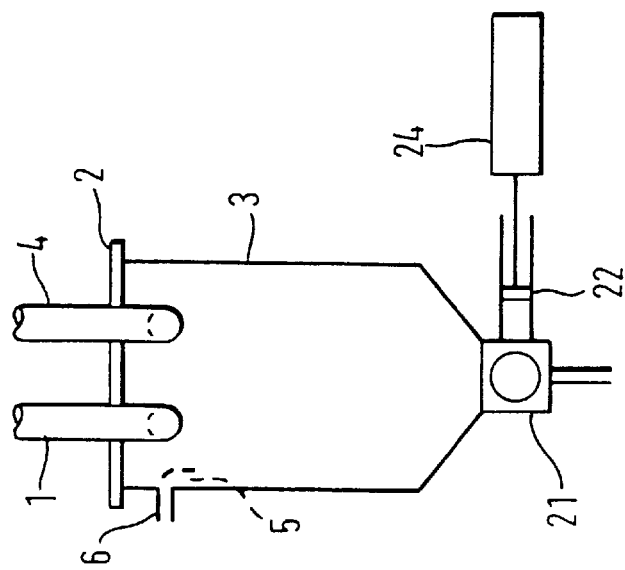

APPARATUS INTEGRATED FOR METERING PRODUCTS TO AND SUCTIONING PRODUCTS FROM MOLDS

BACKGROUND OF THE INVENTION

The present invention relates to apparatus employed for molding and freezing confectionery substances to obtain frozen confectionery articles and particularly, to making multi-component confectionery articles with devices which meter products to molds for making the articles and with devices for suctioning products from the molds and to recycling suctioned product for reuse.

The production of molded articles of frozen confectionery in individual portions, in particular stick ice lollies, composed of several differently flavoured concentric layers, requires the use of the so-called "shell and core" technique. It consists of allowing a certain thickness of a liquid composition to harden towards the centre by heat transfer from the outside of a mold in contact with a refrigerating liquid, and of emptying the as yet unsolidified central part by suction. Accordingly, a solid shell remains at the periphery, empty in the centre. A new operation combining metering, hardening into a layer and suction can be carried out several times in this way. This technique is currently used for the manufacture of water ice lollies by molding.

A process is known, for example from European Patent Application Publication No. 0 322 469, for manufacturing a multi-layer molded frozen article including inside it alternate layers of ice cream and chocolate leaves in the form of a shell. In this process, the successive alternate layers of ice cream and chocolate are created by filling molds, solidifying the periphery, withdrawing the still liquid centre, spraying chocolate into the central cavity and repeating the preceding filling and withdrawal operations. The devices enabling filling and withdrawal to be carried out are not described, but it is clear that they operate separately. Moreover, it is not specified that the liquid withdrawn is recycled.

The manufacture of molded chocolate shells by filling cells, solidifying the periphery and then withdrawing the centre is described, for example, in U.S. Pat. No. 3,529,553. Although the liquid withdrawn is recycled by means of a pump to the feed hopper, filling and withdrawal are carried out separately by means of distinct devices.

A need is felt to improve the quality and production efficiency of articles of this shell-and-core type as well as a need to obtain better cleaning hygiene.

Up to now, the aspiration technique generally used for simplifying manufacture and improving cleaning hygiene has consisted of profiting from the principle of volumetric metering by means of a piston moving inside a filling chamber with one metering unit per filling line, and a filling line which can comprise as many as 20 tracks. The filling chamber is connected to a pipette by a pipe and via valves and the pipette dips into the centre of the mold. Coordination is achieved by means of a mechanical linkage in two stages. In a first stage, a relative movement of the piston in its chamber produces a vacuum and liquid is pushed up inside the chamber under the effect of ambient air pressure, filling coming to an end when the piston arrives at the end of the stroke at the bottom of the chamber. In a second stage, the pipette leaves the mold as the movement of the piston in the chamber reverses, and due to the valves, liquid is expelled into a second pipe and is hence recycled, either into an intermediate buffer reservoir or directly into the metering hopper the latter containing recycled liquid and fresh liquid added in a quantity corresponding to the volume already metered. The success of the operation depends on the system being completely liquid-tight. The degree of maintenance and care to be taken over cleaning as many systems as there are tracks, multiplied by the number of suction operations required, dictated by the nature of the composite product to be manufactured, is considerable. These difficulties explain why this system is only used for metering nonviscous syrups constituting compositions for water ices.

SUMMARY OF THE INVENTION

One object of the present invention is to enable liquids to be aspirated which are more difficult to handle than compositions for water ices, and this within a wide range of temperatures, among which may be, quoted aerated or expanded compositions and visco-elastic compositions such as ice creams, liquids with pieces provided they can themselves be metered, very viscous compositions such as, for example, caramel and sauces, and chocolate enrobing compositions or the like which, without being very thick, easily solidify in a system with a piston and valves, and in this case, the hopper may include an insulating or heated jacket.

Another object of the invention is the accomplishment of interpreted metering and aspiration with recycling by means of a single device, having a simple and compact structure, which can be easily cleaned, without making use of intermediate vessels, pumps and valves.

The invention thus concerns a device for integrated metering and suction of liquid products in a production line for molding frozen confectionery articles in containers passing through an environment for solidifying the products, wherein the device comprises:

a hopper for containing liquid product to be metered;

means connected to an upper part of the hopper for supplying product into the hopper for partially filling the hopper and for supplying product to maintain a filling level;

means for adjusting the filling level of the product in the hopper between a low level and a high level;

means for connecting the hopper, at an upper part of the hopper above a filling level, with a vacuum pump;

means for metering the product from the hopper into molds presented under the hopper, the metering means being connected to the lower part of the hopper below the filling level; and means for sucking out the product connected, on one hand, to the upper part of the hopper above the filling level and on another hand, to a pipette for dipping into the molds for withdrawing an unsolidified center thereof and for recycling the unsolidified product to the hopper.

The device according to the invention may be applied to any machine for freezing articles of frozen confectionery such as for example:

a freezing machine using brine, which is in a straight line, rotates, is oval or has a square movement, a freezing machine using any liquid or gaseous refrigerating fluid, or using evaporation, which bathes the molds or sprays them for a varying period of time, a machine in which the molds are transported by a conveyor in a tunnel with pulsed air producing deep freezing, it being possible for the conveyor to be in a straight line or to unroll, for example in single or double flattened helix or helix of revolution, and any machine of the preceding type in which the molds move continuously or in steps.

The device according of the invention may be applied in a very simple manner to existing machines by converting the metering devices so as to create depressurization in the metering hopper. To this end, it is suffiecient to close the hopper with a lid, to connect the upper part of the hopper to a vacuum pump system and to connect the suction pipettes directly to the hopper. This principle may be applied to various types of metering devices such as, for example, metering devices with a distribution cock and vertical or horizontal cylinders, metering devices with valves or metering devices with dipping nozzles of the "bottom-up filler" and "pencil filler" type.

The invention also concerns a process for the metering and suction of liquid products and particularly, viscous products, in a line for molding articles of frozen confectionery in molds passing through an environment for solidifying the products, characterized in that the metering of a product in the containers and the withdrawal of the product from an yet unsolidified centre takes place in a concomitant manner by means of a single device.

According to the invention, in order to manufacture molded articles of composite frozen confectionery, in particular multi-flavour ice lollies, molds are filled with a composition to be frozen as they move in line in a solidifying environment, the composition is solidified at the periphery, the as yet unsolidified centre is withdrawn and these operations are repeated. Filling and withdrawal take place in a concomitant manner by means of a single device permitting recycling of the composition to be frozen which is as yet unsolidified.

The invention is described in greater detail by way of illustration with the aid of the accompanying drawings.

BRIEF DESCRIPTION OF THE DRAWING FIGURES

FIG. 1 is a diagrammatic view of a metering device of which the hopper is placed directly on the metering cock with the cylinders fixed laterally to the horizontal.

FIG. 2 is a diagrammatic view of a metering device of which the hopper is offset laterally with respect to the cock to provide room for the cylinders fixed vertically on the cock.

FIG. 3 is a diagrammatic view of a metering device without a cylinder of which the hopper connects directly onto the cock, but where the passages are closed by valves.

DETAILED DESCRIPTION OF THE DRAWING FIGURES AND OF THE INVENTION

Figure 4:
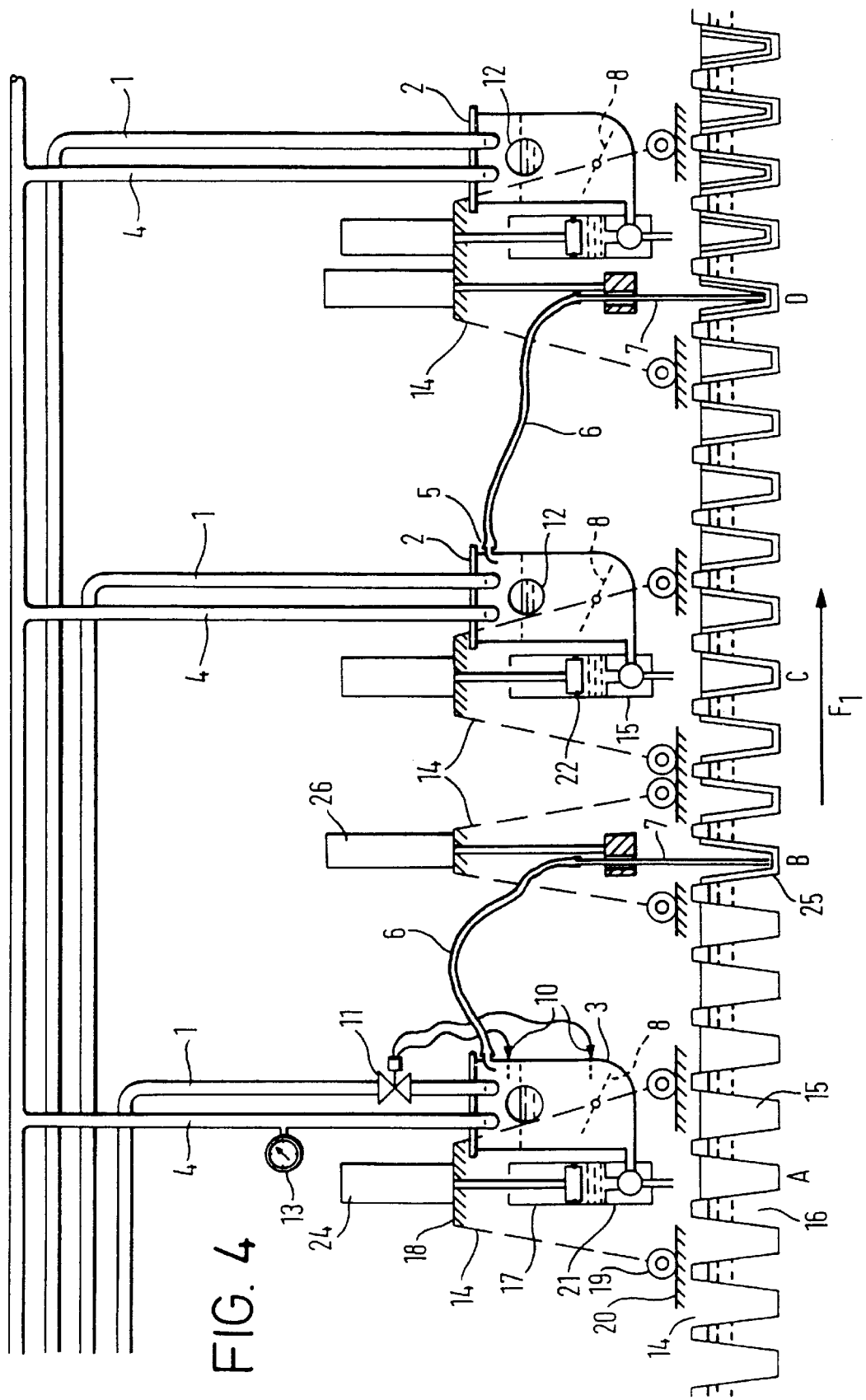
FIG. 4 represents a diagrammatic view of the device in situ on a track of a straight line machine manufacturing ice lollies.

In FIGS. 1 to 4, a pipe supplying the composition to be frozen 1 is connected vertically onto the lid 2 or preferably onto the side of the hopper 3, which extends via a hopper sidewall vertically from a hopper bottom to a hopper top, so that the lid 2 can be easily removed for cleaning. A vacuum line 4 is connected on the one hand to the hopper 3 and on the other hand to pumps (not shown). The hopper 3 may include deflectors 5 for preventing direct aspiration of the recycled or supplementary liquids. The deflectors 5 may also be fixed under the lid (FIG. 2.) A flexible hose 6, of which one end is attached to a pipette 7, is connected to the upper front part of the hopper.

The mixer 8 enables a homogeneous mixture to be obtained from a "new" composition and a recycled composition. The two level sensors 10 (low level and high level) maintain a stationary liquid level in the hopper 3 which provides, with reference to the hopper sidewall, a headspace between the high level and the lid, by controlling an electromagnetic valve 11 so as to supply the hopper with new composition on demand. These level sensors may be situated either on the lid 2, or on the side of the hopper 3. The lid 3 is advantageously made of unbreakable material, for example of stainless steel. In order to check visually the satisfactory operation of the system, a sight glass 12 is provided on the side of the hopper 3. A pressure sensor 13, placed on the vacuum pipe 4 close to the hopper 3, enables the vacuum level to be adjusted exactly as a function of the viscosity of the composition to be frozen and in step with the machine. An electromagnetic valve (not shown) may be disposed on the vacuum line 4. This enables, when necessary, the vacuum level to be modulated as a function of the filling and withdrawal phases of the chambers.

In FIG. 4, the device according to the invention is in a production situation on a line manufacturing multi-flavour ice lollies. The endless conveyor 14 conveys, the molds 15 in the direction of the arrow $f_1$ step-by-step in a freezing tank of brine 16. Several successive metering and aspiration stations are shown and they operate identically. The metering device 17 and the associated hopper 3 are mounted on a frame 18, which can move in translation by means of rollers 19 rolling over rails 20. At "A", a cooled mold 15 is filled with the composition to be frozen via a metering means connected with the hopper and particularly, as illustrated, via the three-way cock 21 by means of the metering piston 22 (FIGS. 1 and 2) or the valve 23 (FIG. 3) actuated by the cylinder 24. After passing through the refrigerating medium, the composition solidifies at the periphery of the mold 15 in a layer 25. At "B" the still liquid centre is withdrawn by the pipette 7 and the latter is lifted out of the mold by means of the jack 26. A composition to be frozen of a different type may then be introduced at "C" and the centre then withdrawn at "D" and so on until the required number of successive layers are obtained by repeating the preceding operations. With the aim of simplification, the sensors 10 and the electromagnetic valve 13 have only been shown in the case of the first metering device.

As shown in FIG. 4, the elements for metering and aspiration at the end of manufacture, comprising the metering device and pipette/jack assembly associated with the preceding metering device, are on the same moveable frame 18, as shown at "D" whereas usually, the aspiration pipettes are mounted on independent supports. This arrangement enables an appreciable gain in space to be achieved, in particular on short machines.

In the representation of FIG. 4, the subsequent operations of inserting a stick, removing from the mold and wrapping the finished articles are not shown.

The device and the process according to the invention have the following substantial advantages compared with known techniques, given by way of example:

a precise manometric control of aspiration as a function of the viscosity of the product to be aspirated, an efficiency of aspiration which is independent of the rhythm of the machine, the possibility of manufacturing new multi-layer products, aspiration of the composition to be frozen from the storage vessel without need of a pump, a gain of space on the line which enables the freezing time to be reduced, reduced overall dimensions by reducing the number of items of equipment on the line, pipettes simplified to the maximum, free or their support, which enables their stroke to be adjusted rapidly and easily, and very simple cleaning of the aspirating components guaranteeing the hygiene of the process.

The device and process have been described in connection with the manufacture of ice lollies. They are of course applicable to the manufacture of molded articles of a different nature such as for example cones or tubs. The device has been described in connection with one metering track for reasons of simplification. A machine in a manufacturing situation may of course comprise up to 20 metering and aspirating tracks in parallel.

I claim:

1. An apparatus integrated for metering liquid products to molds for molding to obtain molded articles and for suctioning molds to remove liquid product from molded article products formed in the molds and to recycle suctioned liquid product for preparing further molded article products comprising, for and when in operation:

a hopper for containing a liquid product and a headspace under a vacuum pressure and positioned to extend vertically via a hopper sidewall from a hopper bottom to a hopper top;

means connected to the hopper for receiving liquid product contained by the hopper from the hopper and for metering the liquid product into molds;

means connected to the hopper for supplying fresh liquid product to the hopper and with reference to the hopper sidewall, for maintaining a liquid product fill level in the hopper for providing a hopper top portion headspace area;

means which comprises a pipette device for suctioning liquid product from molds and for recycling liquid product suctioned from the molds to the hopper and which is connected to the hopper at a position so that recycled product is delivered to the hopper at a position at the hopper headspace area; and means comprising a vacuum pump connected to the hopper at a position for providing a vacuum pressure in the headspace and for suctioning liquid product from molds via the means which comprises the pipette for suctioning and recycling liquid product to the hopper.

2. An apparatus according to claim 1 further comprising a mixing device positioned in the hopper for mixing liquid product contained in the hopper.

3. An apparatus according to claim 1 wherein the hopper top comprises a removable lid.

4. An apparatus according to claim 3 wherein the means for supplying fresh liquid product to the hopper is connected to the lid.

5. An apparatus according to claim 3 wherein the means for supplying liquid product to the hopper is connected to the hopper sidewall.

6. An apparatus according to claim 3 or 4 or 5 wherein the means to provide vacuum pressure to the hopper is connected to the lid.

7. An apparatus according to claim 3 or 4 or 5 wherein the means which comprises the pipette for suctioning and recycling liquid product is connected to the hopper sidewall.

8. An apparatus according to claim 7 wherein the means which comprises the pipette for suctioning and recycling liquid product is connected to the hopper sidewall.

9. An apparatus according to claim 1 wherein the means which comprises the for providing the vacuum pump comprises means for adjusting vacuum pressure which comprise a pressure sensor.

10. An apparatus according to claim 1 wherein the means connected to the hopper for supplying fresh liquid product and maintaining a product fill level comprises level sensors positioned in the hopper to detect the liquid product fill level and comprise an electromagnetic valve connected with the sensors for controlling the fresh liquid product supply to the hopper.

11. An apparatus according to claim 1 or 10 wherein the hopper sidewall comprises a sight glass for ascertaining the liquid product fill level.

12. An apparatus according to claim 1 further comprising a movable frame attached to the means which comprises the pipette for suctioning and recycling liquid product and to the means for receiving and metering liquid product so that the means comprising the pipette and the metering means are raised and lowered together.

13. An apparatus according to claim 1 wherein the means for receiving and metering the liquid product comprise a chamber for containing the liquid product, a piston contained by the chamber, a distribution cylinder to actuate the piston for receiving the liquid product in the chamber and for metering the liquid product from the chamber, and a three-way cock for controlling liquid product receipt and distribution paths.

14. An apparatus according to claim 1 wherein the means for receiving and metering the liquid product comprises a valve and a three-way cock.

* * * * *